United States Patent
Dodrill et al.

(10) Patent No.: US 7,836,188 B1
(45) Date of Patent: Nov. 16, 2010

(54) IP UNIFIED AGENT USING AN XML VOICE ENABLED WEB BASED APPLICATION SERVER

(75) Inventors: Lewis Dean Dodrill, Richmond, VA (US); David William Geen, King George, VA (US); Geetha Ravishankar, Glen Allen, VA (US); Satish Joshi, Glen Allen, VA (US); Ryan Alan Danner, Glen Allen, VA (US); Susan Harrow Barban, Midlothian, VA (US); Steven J. Martin, Richmond, VA (US); Swaminathan Ravishankar, Glen Allen, VA (US)

(73) Assignee: Cisco Technology, Inc., San Jose, CA (US)

( * ) Notice: Subject to any disclaimer, the term of this patent is extended or adjusted under 35 U.S.C. 154(b) by 2082 days.

(21) Appl. No.: 09/605,848

(22) Filed: Jun. 29, 2000

Related U.S. Application Data

(60) Provisional application No. 60/152,316, filed on Sep. 3, 1999.

(51) Int. Cl.
*G06F 15/16* (2006.01)
(52) U.S. Cl. .................... 709/227; 709/204
(58) Field of Classification Search .............. 709/227, 709/205, 206, 201, 203, 200, 202, 204
See application file for complete search history.

(56) References Cited

U.S. PATENT DOCUMENTS

| | | | | |
|---|---|---|---|---|
| 4,837,798 A | | 6/1989 | Cohen et al. | |
| 5,675,507 A | * | 10/1997 | Bobo, II | 709/206 |
| 5,721,763 A | * | 2/1998 | Joseph et al. | 379/88.04 |
| 5,835,724 A | * | 11/1998 | Smith | 709/227 |
| 5,958,014 A | * | 9/1999 | Cave | 709/229 |
| 5,959,621 A | * | 9/1999 | Nawaz et al. | 345/733 |
| 5,974,449 A | * | 10/1999 | Chang et al. | 709/206 |
| 6,038,296 A | * | 3/2000 | Brunson et al. | 379/100.11 |
| 6,047,322 A | * | 4/2000 | Vaid et al. | 709/224 |
| 6,055,564 A | * | 4/2000 | Phaal | 709/207 |
| 6,078,581 A | * | 6/2000 | Shtivelman et al. | 370/352 |
| 6,212,535 B1 | * | 4/2001 | Weikart et al. | 715/513 |
| 6,212,548 B1 | * | 4/2001 | DeSimone et al. | 709/204 |
| 6,243,739 B1 | * | 6/2001 | Schwartz et al. | 709/206 |
| 6,269,336 B1 | * | 7/2001 | Ladd et al. | 704/270 |
| 6,301,245 B1 | * | 10/2001 | Luzeski et al. | 370/352 |
| 6,301,609 B1 | * | 10/2001 | Aravamudan et al. | 709/207 |
| 6,327,622 B1 | * | 12/2001 | Jindal et al. | 709/228 |
| 6,366,780 B1 | * | 4/2002 | Obhan | 370/329 |
| 6,374,292 B1 | * | 4/2002 | Srivastava et al. | 709/206 |
| 6,411,685 B1 | * | 6/2002 | O'Neal | 379/88.14 |

(Continued)

OTHER PUBLICATIONS

BOS, "XML in 10 Points", W3.org (Aug. 26, 1999).

*Primary Examiner* — Aaron Strange
(74) *Attorney, Agent, or Firm* — Leon R. Turkevich

(57) ABSTRACT

A method for inter-process communication between non-persistent application instances includes establishing a first non-persistent application instance serving a first party and establishing a second non-persistent application instance serving a second party. In the first application instance, an HTML page is generated having instructions for a persistent browser instance having received the HTML page to initiate a new application session for the second party. Thus, inter-application communication is possible where one non-persistent application instance is able to notify and/or interrupt another non-persistent application instance by way of an associated real time component (web browser or proxy browser).

37 Claims, 5 Drawing Sheets

U.S. PATENT DOCUMENTS

| | | | |
|---|---|---|---|
| 6,421,694 B1 * | 7/2002 | Nawaz et al. | 345/762 |
| 6,445,694 B1 * | 9/2002 | Swartz | 370/352 |
| 6,466,976 B1 * | 10/2002 | Alles et al. | 709/224 |
| 6,484,196 B1 * | 11/2002 | Maurille | 709/206 |
| 6,496,851 B1 * | 12/2002 | Morris et al. | 709/204 |
| 6,675,204 B2 * | 1/2004 | De Boor et al. | 709/217 |

* cited by examiner

IP UNIFIED AGENT USING AN XML VOICE ENABLED WEB BASED APPLICATION SERVER

CROSS REFERENCE TO RELATED APPLICATIONS

This application claims priority from provisional application No. 60/152,316, filed Sep. 3, 1999, the disclosure of which is incorporated in its entirety herein by reference.

BACKGROUND OF THE INVENTION

1. Field of the Invention

The present invention relates to generating and executing voice enabled web applications within a hypertext markup language (HTML) and hypertext transport protocol (HTTP) framework.

2. Description of Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. Hence, the XML documents define the application to be executed by the application server within the runtime environment, enabling voice enabled web applications to be generated and executed without the necessity of programming language environments.

Web-based instant messaging applications have gained popularity since the applications provide a user immediate notification of a message from another party. More particularly, if a user is online and is running an instant messaging application, the user is registered with a server that tracks user sessions and activity. When the user sends a message to another party, the message is immediately apparent to the other party if the other party is online and a subscriber to the messaging service. If the other party is not online, the message is queued and can be retrieved at a later time. In this way, a user can respond if and when the user pleases, but the user has immediate knowledge of the other party's response. This type of communication is useful but limited, since all parties who wish to communicate with instant messages must be registered with the server using a proprietary application and must use a computer to employ the application to send and receive instant messages.

SUMMARY OF THE INVENTION

There is a need for an arrangement that enables users to deploy a scalable, open standards based unified interface for calling services and message management in a single architecture on an open standards based network such as an Internet Protocol (IP) network.

These and other needs are attained by the present invention, where an application server, configured for executing a messaging application defined by XML documents, provides an application runtime environment configured for dynamically generating, for a first party, a hypertext markup language (HTML) document having instructions for a browser to notify a second party of a new application session for the second party so as to present a message from the first party to the second party, based on a determination that the second party is available to receive the message. The application runtime environment is configured to access a common resource containing information regarding both the first and second parties.

Another aspect of the present invention provides a method for inter-process communication between non-persistent application instances. The method includes establishing a first non-persistent application instance serving a first party and establishing a second non-persistent application instance serving a second party. An HTML page is generated, in the first application instance, having instructions for a persistent browser instance, having received the HTML page, to initiate a new application session for the second party.

Hence voice-based instant messaging services, calling service and voice messaging services may be deployed on a platform that is customizable, scalable, and built upon open standards such as Internet protocol. By preserving multiple sessions, parties involved in instant messaging session, a voice messaging session or a calling session can suspend their present session or activity for a moment to create a new session to exchange audio messages and when finished, can instantly resume the suspended session. Thus, users have freedom of access providing them the means of making and receiving calls and message management anytime and virtually anywhere.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
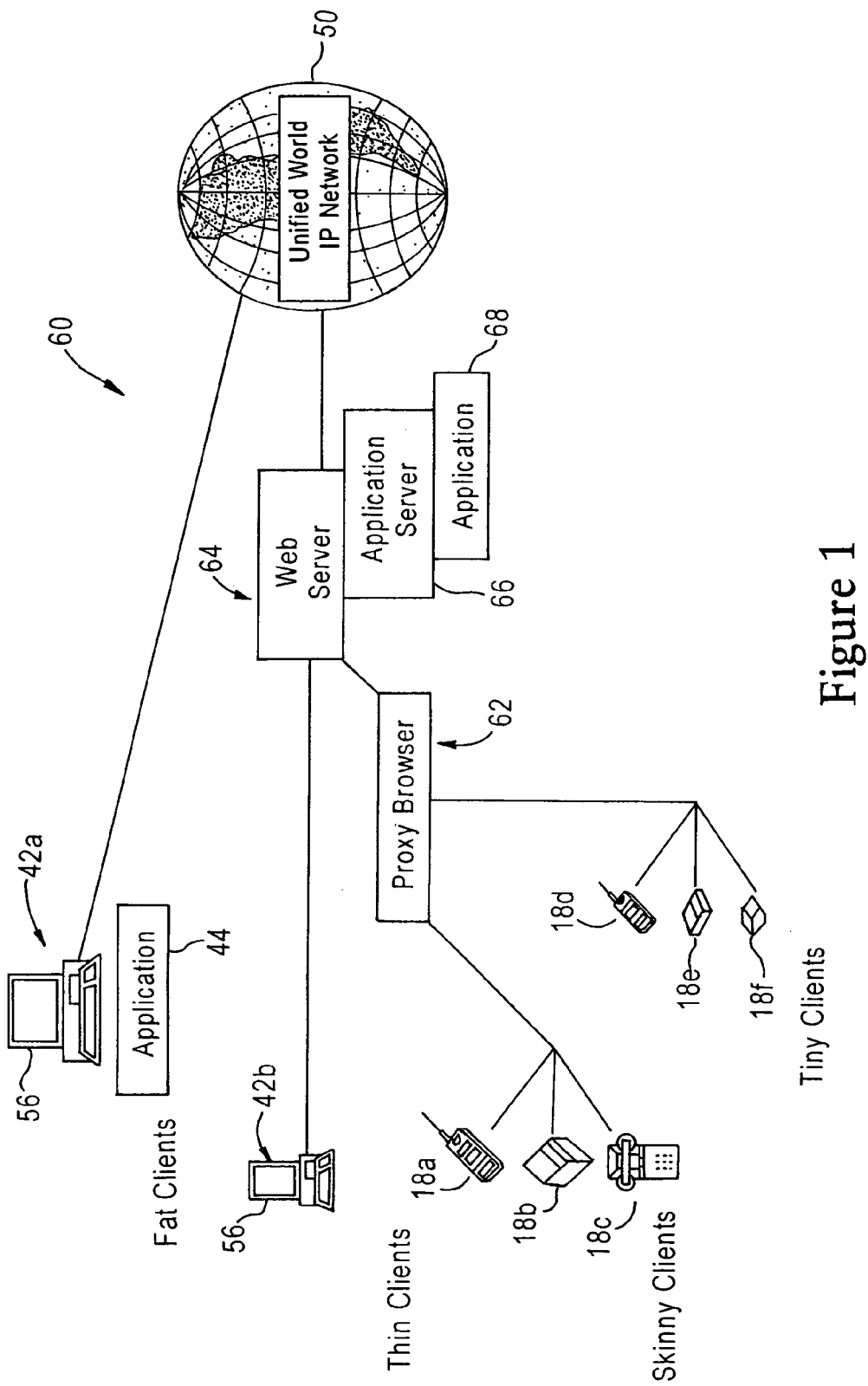
FIG. 1 is a block diagram illustrating an system enabling deployment of calling services and message management, capable of executing voice enabled web applications, according to an embodiment of the present invention.
Figure 3:
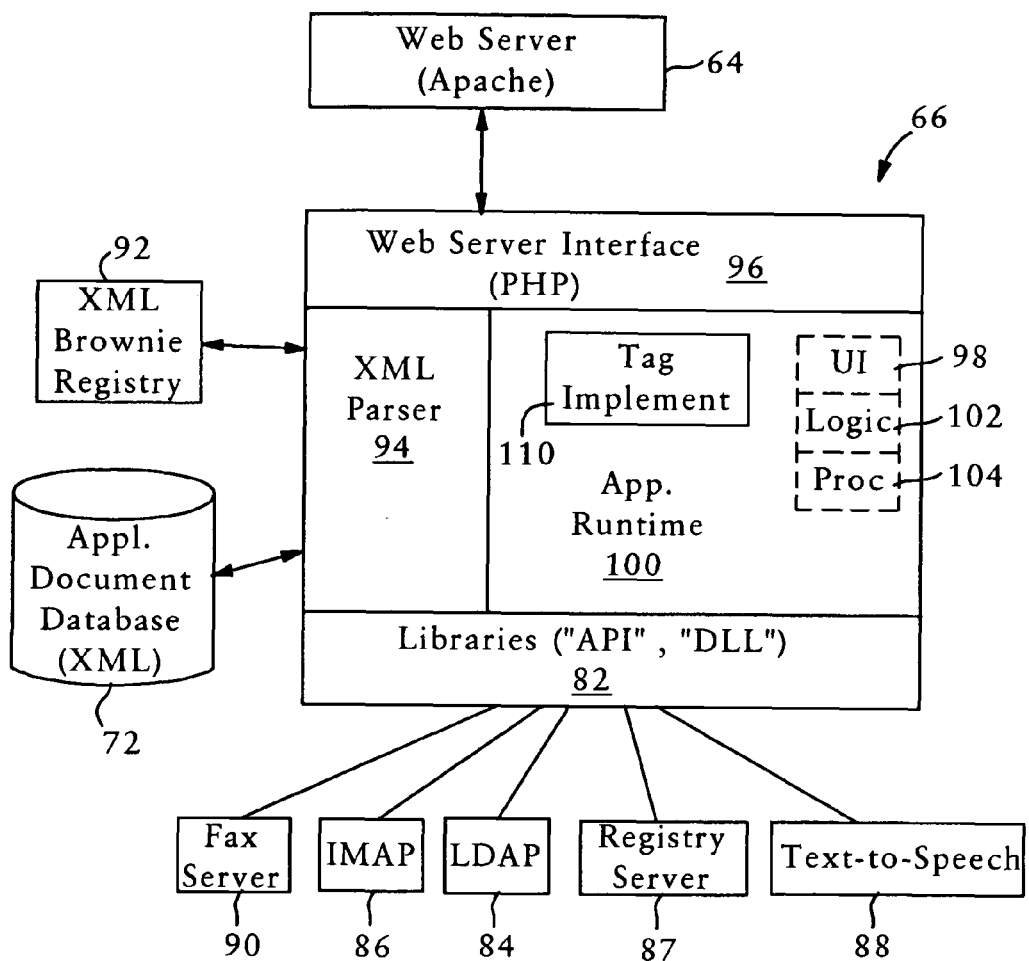
FIG. 3 is a diagram illustrating in detail an application server of FIGS. 1 and 2 according to an embodiment of the present invention.

FIG. 1 is a block diagram illustrating an architecture that provides a unified interface for calling services and message management via an IP network using browser audio control according to an embodiment of the present invention, reproduced from FIG. 3 of the above-incorporated application Ser. No. 09/480,485. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the messaging network 60.

Figure 2:
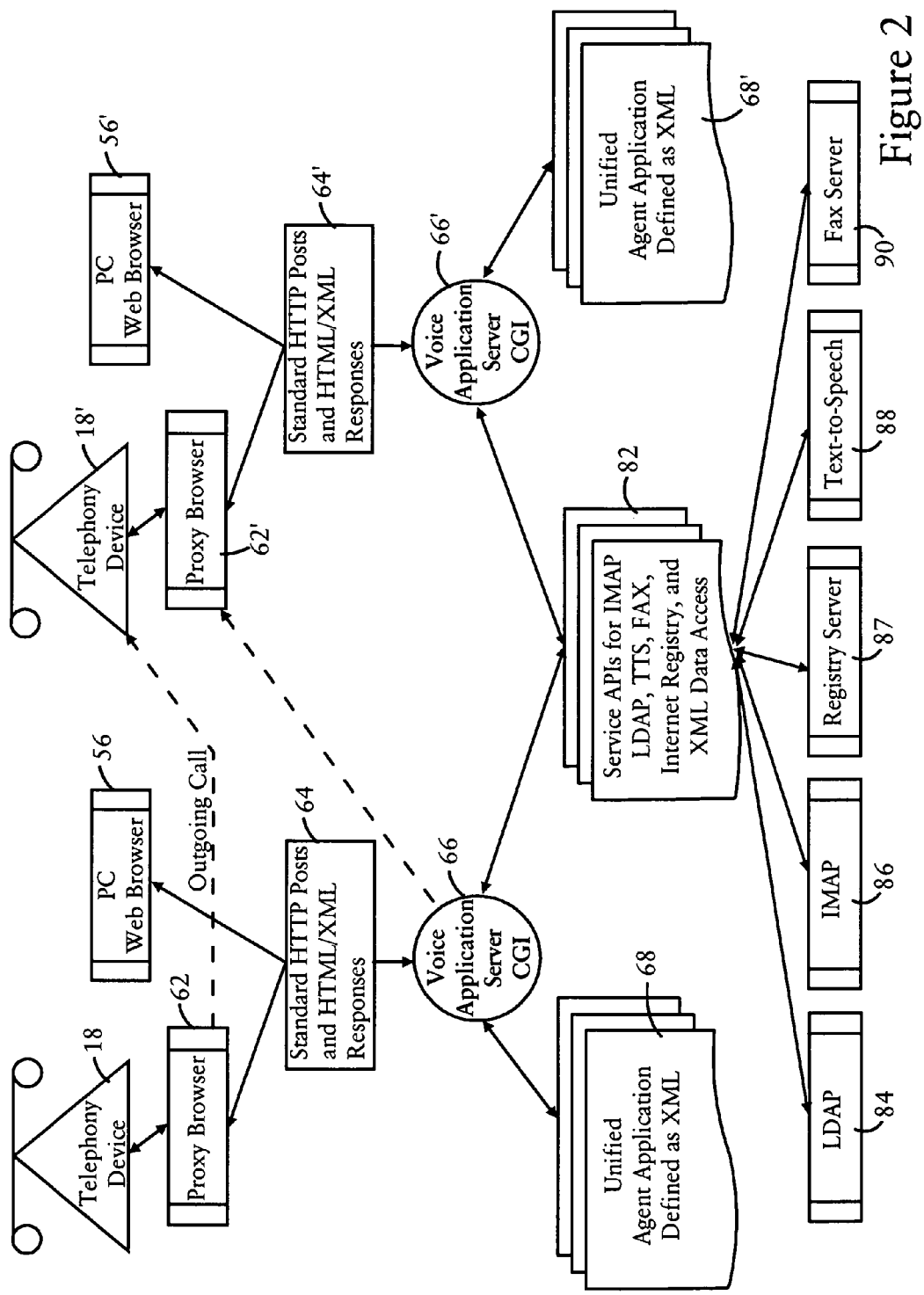
FIG. 2 is a diagram illustrating interactions by application servers of FIG. 1 with resources of a unified interface of an IP network for execution of calling services and message management according to an embodiment of the present invention.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common gateway interface (CGI) as illustrated in FIG. 2, by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages 68 (i.e., XML pages that define an application) and in response generates new HTML pages having XML tags during runtime and supplies the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 18 or 42.

FIG. 2 is a diagram illustrating in further detail the unified interface for calling services and message management applications executed by the voice application server 66 according to an embodiment of the present invention. As described above with respect to FIG. 1, the application server 66 receives, via the web server 64, HTTP requests from either a PC-based web browser 56 capable of supporting full media content (e.g., audio, text, images, and streaming video), or a proxy browser 62 configured for serving as an HTTP interface for a user input device, such as a telephone 18, having limited media capabilities (e.g., audio only). In response to receiving the HTTP requests, the voice application server 66 accesses a selected XML document 68 based on parameters specified within the HTTP request (e.g., commands specified within the URL), and based on application state determined from accessing a brownie, assuming the HTTP request specifies a valid session identifier. As described below, the application runtime environment within the voice application server 66 parses the XML tags within the accessed XML document 68, and dynamically generates an HTML page having XML tags that specify media content (e.g., .wav files) and control information for playing the media files by a proxy browser.

The voice application server 66 is configured for accessing database application programming interfaces (API's) 82 to external resources based on prescribed procedures that may be called during parsing of an XML tags in a selected XML document 68. As described below, the application server 66 issues function calls to APIs 82 for accessing the external resources for prescribed operations, such as IMAP 86, LDAP 84, Web Content 89, Text-to-Speech 88, Registry Server 87, enabling the deployment of a robust, scalable calling service and message management.

FIG. 3 is a diagram illustrating in detail the application server 66 according to an embodiment of the present invention. The application server 66 is implemented as a server executing a PHP hypertext processor with XML parsing and processing capabilities. As shown in FIG. 3, the server 66 includes an XML parser 94 configured for parsing the application-defining XML documents 68 stored in the XML document database 72, or the XML documents (i.e., "brownies") stored in the registry 92 and configured for specifying the state and attributes for respective user sessions. The application server 66 also includes a high speed interface 96 that establishes a high-speed connection between the application server 66 and the web server 64. For example, the PHP hypertext processor includes a high-speed interface for Apache Web servers.

The application server 66 also includes a runtime environment 100 for execution of the parsed XML documents. As described above, the runtime environment 100 may selectively execute any one of user interface operation 98, a logic operation 102, or a procedure call 104 as specified by the parsed XML document by executing a corresponding set of executable functions based on the rule set for the corresponding operation. In particular, the application runtime environment 100 includes a tag implementation module 110 that implements the XML tags parsed by the XML parser 94. The tag implementation module 110 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 110 implements the tag operations that are specified within the XML framework of the stored XML documents.

The application server 66 also includes a set of libraries 82 and 86 that may be implemented as dynamically linked libraries (DLLs) or application programming interface (API) libraries. The libraries 82, 86 enable the runtime environment 100 to implement the procedures 104 as specified by the appropriate XML document. The application server 66 may issue a function call to one of a plurality of IP protocol compliant remote resources LDAP 84, IMAP 86, Registry Server 87, Text-To-Speech 88, or Fax Server 90. For example, the PHP hypertext processor includes executable routines capable of accessing the resources.

The LDAP data store 84 can include user information for instant messaging such as the identities and telephone numbers of persons that the user wishes to communicate with, and a list of persons and telephone numbers which the user wishes to block from instant messaging applications. The IMAP message store 86 can store greetings and/or messages (e.g., voice, e-mail, or fax) in standard e-mail format with audio file attachments.

The registry server 87 is configured to keep track of users who are currently active in an application session, as will be explained in more detail below. In addition, the application server 66 may issue function calls for a text to speech resource 88, or an outgoing fax server 90, in order to deliver different-format messages to users, depending on the capability of the user devices. Hence, the voice application server 66 may access the text to speech resource 88 for converting an e-mail message into a audio-based message to be played for the user of the telephony device 18. Similarly, the voice application server 66 may determine that the proxy browser 66 does not interface with a telephony gateway device having facsimile transmission capabilities, hence the fax message retrieved from the IMAP message store 86 would be sent to the outgoing fax server 90 for retransmission to another telephone number identified as serving a fax machine. Note that the mechanisms for accessing the resources 84, 86, 87, 88 and 90 should be established within the application server before use of XML documents that reference those services. Once the resources 84, 86, 87, 88 and 90 are established, the application runtime environment 100 can perform a function operation by using executable functions specified by a function call rule set.

An arrangement for executing unified messaging application operations will now be described.

The application server 66 is configured for distributing messaging operations across multiple platforms by obtaining subscriber profile information from the LDAP message store 84, and storing and retrieving messages on the IMAP message store 86 in the form of e-mail messages having file attachments.

In particular, unified messaging involves the use of a directory structure and a message store capable of storing more than one type of message. The storage of e-mail messages within an IMAP message store 86 provides the advantage that messages can be stored according to subscriber directories, where each subscriber may have multiple subdirectories for storage of different messages, greetings, etc. In addition, the storage of the mail messages within the IMAP message store 86 by the application server 66 enables the application server 66 to store messages as attachments to the e-mail messages, so long as the attachments are compliant with the e-mail messaging protocols, such as simple mail transport protocol (SMTP) and RFC 822.

The voice application server 66 is configured for converting a received message, such as a voice message supplied by the proxy browser 62 as a MIME-encoded or DPIM-compliant audio file, into a standard protocol message supported by standardized protocols, such as simple mail transport protocol (SMTP). In particular, the application server 66 may implement the conversion of messages for example by generating a procedure call 104 to a prescribed API within the library 82. The application server 66 converts the .wav file, which is a binary file, by using a binary encode process to encode the .wav file into an ASCII string not to exceed 80 columns in width. The string is divided into 80 characters in length, and formatted to resemble a URL encoded string. The application server 66 also generates a header that includes messaging information, for example a "To" field, a "From" field, a "Subject" field, date and timestamp field, and a message format field that specifies the MIME encoding of the original message, for example ".wav" for audio files, ".txt" for e-mail messages, or ".tiff" for image documents such as facsimile transmissions.

Message format conversion may also be necessary, depending on the capabilities of the device couple to the proxy browser 62. For example, a user having a conventional telephone capable only of audio input and output may need the text to speech resource 88 in order to listen to e-mail messages, or to listen to header information for a received fax. However if a user has an attached fax machine but the telephony interface device (e.g., a voice over IP gateway or PBX) coupled to the proxy browser 62 lacks facsimile transmission capabilities, the application server 66 may access the outgoing fax server 90 for actual transmission of an image stored in the IMAP message store 86.

Additional details of unified messaging service are disclosed in commonly assigned, co-pending application Ser. No. 09/588,293, filed Jun. 7, 2000 entitled, "Unified Messaging System Using Web Based Application Server For Management Of Messages Using Standardized Servers", the disclosure of which is incorporated in its entirety herein by reference.

An arrangement for executing calling services in a non-persistent application session will now be described.

Figure 4:
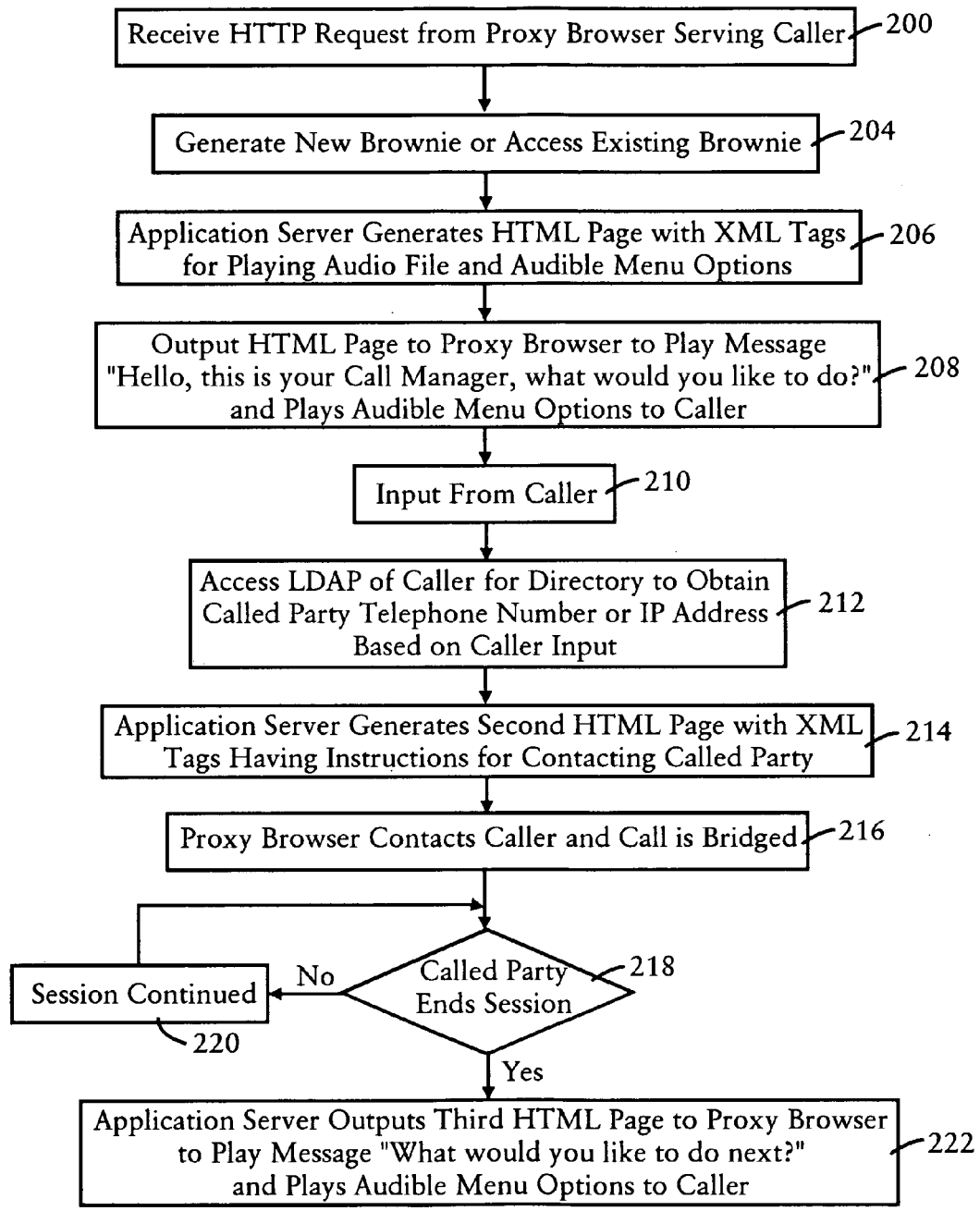
FIG. 4 is a diagram illustrating the execution of calling operations according to an embodiment of the present invention.

FIG. 4 illustrates executing calling services according to an embodiment of the present invention. The steps described in FIG. 4 can be implemented as executable code stored on a computer readable medium (e.g., a hard disk drive, a floppy drive, a random access memory, a read only memory, an EPROM, a compact disc, etc.).

As shown in FIG. 4, the application server 66 receives in step 200 an HTTP request from the proxy browser 62 for initiation of a session for a caller 18. The application server 66 generates a new brownie in step 204 if the caller 18 initiates a new session, else accesses an existing brownie from the registry 92 based on a valid session identifier specified within the HTTP URL request. In response to the HTTP request, the application server 66 generates in step 206 an HTML page with XML tags including an audio file (.wav file) specifying playing of the audio file, with prompts and updates the brownie with the current application state. The HTML page is forwarded for execution by the proxy browser 62 in step 208 causes to be played a message such as "Hello, this is your intelligent dial tone, what would you like to do? Press 1 for accessing your call list, press 2 if you know the name, telephone number or e-mail address of the person you want to call, press 3 for white pages, or simply enter the ten digit telephone number," etc.

The application server 66 then goes to a restful (non-persistent) state in step 210. Based on an input from the caller 18 received as an HTTP post in step 212, the application server 66 resumes the application session from the application state specified in the brownie, and accesses the LDAP data store 84 to obtain the called party information as defined by the caller.

For example, if the caller knows the name and telephone number but not the e-mail address of a called party, the IP address and/or e-mail address associated with the name is retrieved from the LDAP 84 by the application server 66, eliminating the necessity for existing telephony gate agents such as gatekeepers, call mangers, or virtual switch controllers. If necessary, for a specific calling service such as instant messaging, the application server 66 may also access registry server 87 (FIG. 2) to determine if the called party is "active" (e.g., currently in a valid session with its corresponding application server 66'). Note that the LDAP directory 84 may also search other LDAP directories if the called party is unknown.

The application server, in step 214, generates a second HTML page with XML tags having instructions for contacting the called party and outputs the second HTML page. Depending on the nature of the calling service being requested by the calling party 18, the HTML page is sent to the proxy browser 62, or alternately to the proxy browser 62' for initiation of a new application session. In the former case, in step 216, the proxy browser 62 establishes a Real Time Protocol (RTP) session with the destination IP address (e.g., the PC web browser 56') or causes a telephony device (e.g., a PBX) to call the called party and bridge the call to connect the caller on telephone 18 with the called party on telephone 18' (FIG. 2). Alternately, the caller can be connected with the called party if the application server 66 sends a new session URL containing a request for an out-dial to proxy browser 62'. In this case, the called party is not associated with proxy browser 62' until the call is answered.

The application server 66 determines in step 218 that the called party has hung up (ended session) for example, by receiving an HTTP request for the proxy browser 62 indicating the called party has ended the call. If the called party has not ended the session, the session continues in step 220. If the called party has ended the session, in step 222, the application server 66 outputs an HTML page to proxy browser 62 which plays a message such as "What would you like to do next?", with prompts. Thus, in the disclosed embodiment, the caller can connect to multiple destinations from a single call. Similar variations may be utilized upon detecting an interval of inactivity indicating the calling party has been put on "hold".

Thus, the calling service operations described above employs the non-persistent application server 66. The invention also relates to inter-process communication between non-persistent applications by way of an associated real time component, such as a browser.

An example of one non-persistent application session initiating another non-persistent application session in the context of instant messaging application operations will now be described.

With reference to FIG. 2, a voice application server 66' permits a receiving party to participate in instant messaging with the sending party via web server 64', proxy browser 62', telephone 18' and common APIs 82. The application server 66' accesses selected stored XML application pages 68' (i.e., XML pages that define an application) and APIs 82 for function calls to the LDAP 84, IMAP 86, Registry Server 87, Text-To-Speech 88, or Fax Server 90 in a manner similar to application server 66 serving the sending party.

Figure 5:
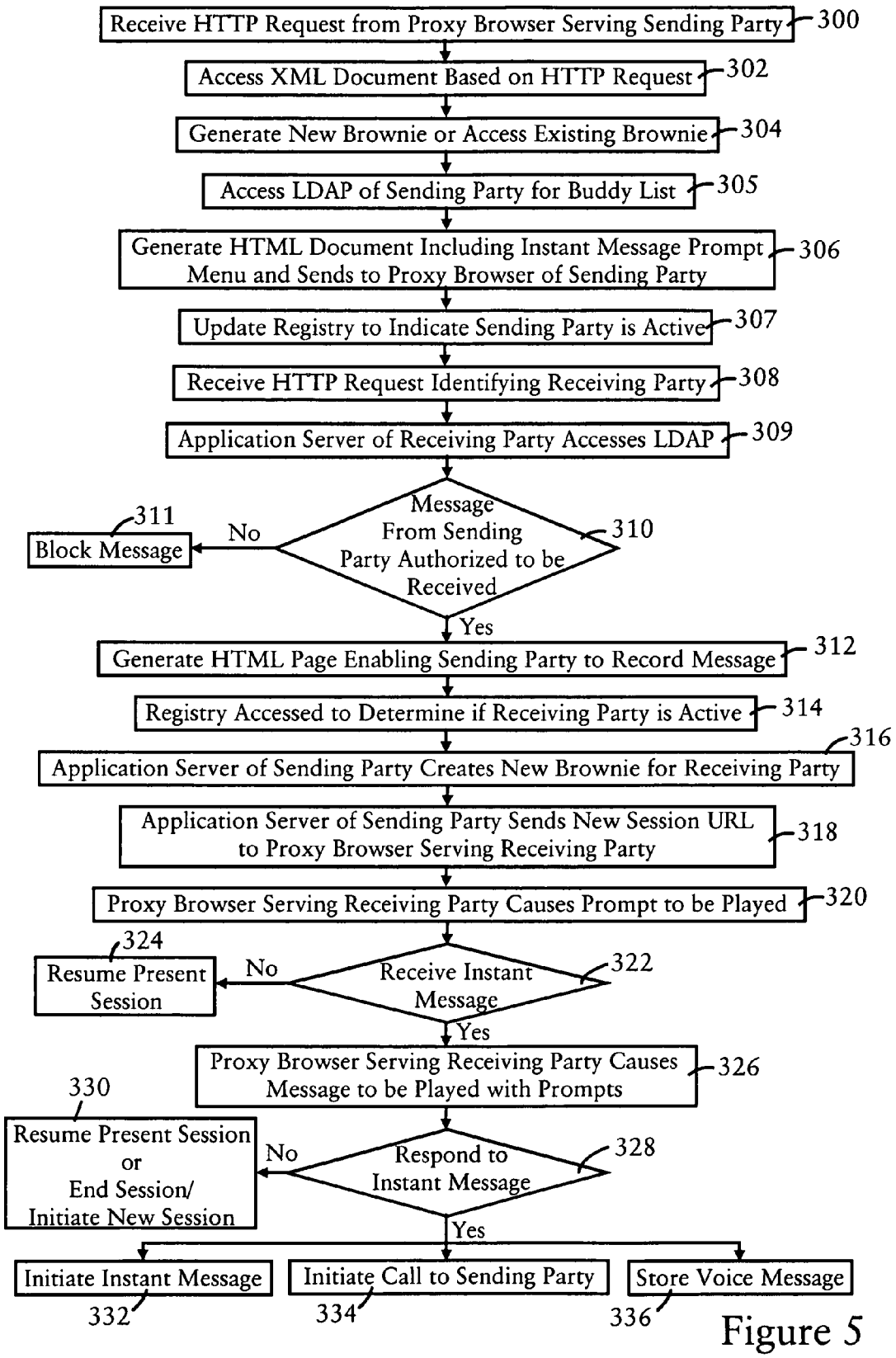
FIG. 5 is a diagram illustrating the execution of instant messaging system operations and response thereto according to an embodiment of the present invention.

FIG. 5 illustrates sending an instant message to a receiving party according to an embodiment of the present invention. The steps described in FIG. 5 can be implemented as executable code stored on a computer readable medium (e.g., a hard disk drive, a floppy drive, a random access memory, a read only memory, an EPROM, a compact disc, etc.).

As shown in FIG. 5, the application server 66 receives in step 300 an HTTP request from the proxy browser 62 for initiation of a session enabling a sending party to send an instant voice message. The application server 66 responds to the HTTP request in step 302 by accessing a selected XML document 68 from the document database 72 that specifies the application operations for generating an HTML document that includes an audible prompt menu for sending an instant message. The application server 66 also generates a new brownie in step 304 if the sending party is initiating a session with the application server 66, else accesses an existing brownie from the registry 92 based on a valid session identifier specified within the HTTP URL request. The application server 66 accesses, in step 305, the LDAP data store 84 of the sending party to obtain the sending party's profile including his or her "buddy list", and generates to HTML document including the instant message prompt menu for the browser 62 in step 306.

The application server 66 then accesses the registry server 87 in step 307 to update the registry to indicate that the sending party is now available for instant messaging by storing the sending party's identity and the session identifier that identifies the corresponding brownie. The registry server 87 can employ a SQL database or have an XML format.

The browser serving the sending party posts the user's input from the prompt menu and sends an HTTP request to the application server 66 identifying the receiving party in step 308.

The application server 66 accesses the LDAP data store 84 in step 309 to determine in step 310 if the receiving party has authorized the receipt of messages from the sending party. If the receiving party has not authorized receipt of a message from the sending party, messaging is blocked in step 311. If authorization is given, the application server 66 in step 312 generates an HTML page enabling the sending party to record a voice message for the receiving party.

The application server 66 accesses the registry server 87 in step 314 to determine if receiving party is available for instant messaging. If the receiving party is available (currently in a session with application server 66' via telephone 18'), the application server 66 serving the sending party obtains the existing session identifier for the receiving party, and generates in step 316 a new brownie having a new session identifier for a new session for the receiving party. The session identifiers are cross-referenced in the existing brownie and the new brownie (e.g., new session ID stored in existing brownie and existing session ID stored in new brownie) to enable the voice application server 66' to "interrupt", in a controllable manner, the existing session with the new session providing the instant message.

The application server 66 generates another HTML page which includes a URL having instructions for initiating the new session, including the new session identifier for retrieval of the voice message. This HTML page is sent to the persistent proxy browser 62' of the receiving party in step 318. In step 320, the proxy browser 62' automatically posts the URL to the application server 66' which responds to the URL by accessing the specified XML document having tags specifying placing the existing brownie on "hold" and accessing the new brownie for generation of a new HTML page; the new HTML page causes a prompt to be played for the receiving party such as, "Hello, you have an instant message from Mary Smith. Press 1 to listen, or press 2 to resume your present session." If the receiving party inputs 2 in step 322, the application server 66' deletes the new brownie, reactivates the brownie on "hold" and resumes the present session in step 324. If 1 is inputted, in step 326, the instant message is played with prompts such as, "To respond to the message press 1, to connect with the sending party press 2, to store the message press 3". If the receiving party now inputs 1, in step 328, the receiving party can respond to the instant message by creating his or her own instant message in step 332. If the receiving party chooses to speak with the sending party, the receiving party inputs 2 and the call is bridged (via voice over IP) in step 334. If the receiving party wants to store the message, the receiving party inputs 3 and the message is stored in the IMAP message store 86 in step 336 so that the receiving party may listen to the message at a later time.

It can be appreciated that instead of having the application server 66' place the existing brownie on hold and access the new brownie, the proxy browser 62' alone can manage the "hold" function. For example, the proxy browser 62' can be configured to distinguish between active and inactive HTML pages and chase the active page.

Thus, the proxy browser 62', a persistent process on behalf of the user of the telephony device 18', listens for unsolicited notification from authorized sources with additional information being sent to the proxy browser 62' to accommodate real-time interruptions. Additional details regarding execution of XML documents by the application server 66 are disclosed in the above-incorporated application Ser. No. 09/480,485.

Hence, according to the disclosed embodiments, instant messaging services, voice messaging service, and calling services (unified agent applications) may interact on a platform that is customizable, scalable, and built upon open standards such as Internet protocol.

Further, according to the disclosed embodiment, inter-application communication is possible where one non-persistent application instance is able to notify and/or interrupt another non-persistent application instance by way of an associated real time component (web browser or proxy browser).

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an application server for initiating inter-process communication between non-persistent application sessions, the method comprising:
   initiating a first application instance for establishment of an application session between the application server and a first party;
   determining whether a second party is available to receive a message having been established in the application session between the application server and the first party; and
   based on the determined availability of the second party, generating a HTML page, originating in the first application instance, having instructions for a browser, in use by the second party, to notify the second party of a new application session for the second party so as to present the message to the second party,
   wherein the generating step includes inserting a uniform resource locator (URL) within the HTML page causing the browser to request interruption of a present application session of the second party, established by another application instance distinct from the first application instance, to create the new application session for the second party.

2. The method of claim 1, further comprising generating a new session identifier that specifies the new application session for the second party, wherein the URL includes the new session identifier for interrupting the present session of the second party with the new application session.

3. The method of claim 2, further including initiating a second application instance for execution of the new application session for the second party based on a server-side data record configured for storing a state of the new application session and selected based on the new session identifier, in response to receipt of the URL from the browser.

4. The method of claim 1, wherein the HTML page includes a prompt enabling the second party to respond to the message.

5. The method of claim 1, wherein the determining step includes accessing a registry locally accessible by the application server, and the method further including updating the registry to indicate that the first party is available for messaging operations.

6. The method of claim 1, further including storing the message in a data store of the second party.

7. The method of claim 6, wherein storing of the message is performed in accordance with IMAP protocol.

8. The method of claim 1, further including accessing attribute information of the second party to determine whether the second party authorizes receipt of the message from the first party.

9. The method of claim 8, wherein the attribute accessing step includes accessing a database server according to LDAP protocol.

10. The method of claim 1, wherein the message is a voice message and the HTML page includes instructions for playing the voice message.

11. A method for inter-process communication between non-persistent application instances, the method comprising:
   establishing a first non-persistent application instance serving a first party;
   establishing a second non-persistent application instance serving a second party; and
   generating an HTML page, originating in the first application instance, having instructions for a persistent browser instance in use by the second party, having received the HTML page, to interrupt a present application session having been generated by the second application instance on behalf of the second party and initiate a new application session for the second party.

12. The method of claim 11, further including accessing, by at least one of the first and second application instances, a common resource over an IP network.

13. The method of claim 12, wherein the common resource is a registry, the method including accessing the registry to determine whether the second party is currently active in the second application instance.

14. The method of claim 12, wherein the common resource is a data store for storing attribute information of each of the first and second parties, the method including accessing the data store in accordance with LDAP protocol.

15. The method of claim 12, wherein the common resource is a messages store for storing messages for each of the first and second parties, the method including accessing the message store in accordance with IMAP protocol.

16. The method of claim 11, wherein the first application instance is established in first application server and the second application instance is established in a second application server.

17. The method of claim 12, wherein the common resource is accessible via an application programming interface (API).

18. The method of claim 11, further including initiating an application instance for execution of the new application session for the second party based on a server-side data record configured for storing a state of the new application session and selected based on the new session identifier, in response to receipt of the HTML page from the browser.

19. An application server configured for executing a messaging application, the application server including:
an application runtime environment configured for dynamically originating and generating in a first application instance between the application server and a first party, a hypertext markup language (HTML) document having instructions for a browser to notify a second party of a new application session for the second party, based on a determination that the second party using the browser is available to receive the HTML document, the application runtime environment being configured to access a common resource containing information regarding both the first and second parties,
wherein the HTML document has instructions to interrupt a present application session of the second party, established by another application instance distinct from the first application instance, to create the new application session for the second party.

20. The application server of claim 19, wherein the HTML document includes a prompt enabling the second party to respond to the message.

21. The application server of claim 19, wherein the common resource includes a registry and the application runtime environment is configured to access the registry and to update the registry to indicate that the first party is available for messaging operations.

22. The application server of claim 19, wherein the application runtime environment is configured to access the common resource via an application programming interface (API).

23. The application server of claim 19, wherein the common resource includes user attribute information stored in a database server in accordance with LDAP protocol and the application runtime environment is configured to access the database server.

24. The application server of claim 19, wherein the common resource includes a message store for storing the message in accordance with IMAP protocol and the application runtime environment is configured to access the message store.

25. The application server of claim 19, wherein the common resource includes a registry and the application runtime environment is configured to access the registry and to determine whether the second party is available to receive the message.

26. A computer readable medium having stored thereon sequences of instructions for initiating inter-process communication between non-persistent application sessions, the sequences of instructions including instructions for performing the steps of:
initiating a first application instance for establishment of an application session between the application server and a first party;
determining whether a second party is available to receive a message having been established in the application session between the application server and the first party; and
based on the determined availability of the second party, generating a HTML page, originating in the first application instance having instructions for a persistent browser, in use by the second party, to notify the second party of a new application session for the second party so as to present the message to the second party,
wherein the generating step includes inserting a uniform resource locator (URL) within the HTML page causing the browser to request interruption of a present application session of the second party, established by another application instance distinct from the first application instance, to create the new application session for the second party.

27. The medium of claim 26, further comprising generating a new session identifier that specifies the new application session for the second party, wherein the URL includes the new session identifier for interrupting a present session of the second party with the new application session.

28. The medium of claim 27, further including initiating a second application instance for execution of the new application session for the second party based on a server-side data record configured for storing a state of the new application session and selected based on the new session identifier, in response to receipt of the URL from the browser.

29. The medium of claim 26, wherein the HTML page includes a prompt enabling the second party to respond to the message.

30. The medium of claim 26, wherein the determining step includes accessing a registry locally accessible by the application server, and the method further including updating the registry to indicate that the first party is available for messaging operations.

31. The medium of claim 26, further including storing the message in a data store of the second party.

32. The medium of claim 31, wherein storing of the message is performed in accordance with IMAP protocol.

33. The medium of claim 26, further including accessing attribute information of the second party to determine whether the second party authorizes receipt of the message from the first party.

34. The medium of claim 33, wherein the attribute accessing step includes accessing a database server according to LDAP protocol.

35. The medium of claim 26, wherein the message is a voice message and the HTML page includes instructions for playing the voice message.

36. An application server configured for executing a messaging application, the application server including:
means for dynamically originating and generating in a first application instance between the application server and a first party, a hypertext markup language (HTML) document having instructions for a browser to notify a second party of a new application session for the second party so as to present a message from the first party to the second party, based on a determination that the second party using the browser is available to receive the message,
wherein the HTML document has instructions to interrupt a present application session of the second party, established by another application instance distinct from the first application instance, to create the new application session for the second party.

37. The application server of claim 36, wherein the HTML document includes a prompt enabling the second party to respond to the message.

* * * * *